(12) United States Patent  
Seetharaman et al.

(10) Patent No.: US 7,676,153 B1  
(45) Date of Patent: Mar. 9, 2010

(54) DIGITAL DELAY DEVICE

(75) Inventors: Guna Seetharaman, Dayton, OH (US);  
Paul E. Kladitis, Edwards, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1152 days.

(21) Appl. No.: 11/251,192

(22) Filed: Oct. 17, 2005

(51) Int. Cl.  
*H04J 14/00* (2006.01)

(52) U.S. Cl. .............................. 398/45; 398/53; 385/18

(58) Field of Classification Search ............... 398/53, 398/102, 161, 45, 51, 54; 385/18, 19, 17  
See application file for complete search history.

(56) References Cited

U.S. PATENT DOCUMENTS

| | | | |
|---|---|---|---|
| 5,103,333 A | 4/1992 | Koai | |
| 5,291,569 A * | 3/1994 | Goutzoulis et al. | 385/39 |
| 5,822,100 A | 10/1998 | Robinson et al. | |
| 6,816,640 B2 | 11/2004 | Tew | |
| 6,839,479 B2 | 1/2005 | Berger et al. | |
| 6,859,578 B2 | 2/2005 | Riza | |
| 6,900,919 B1 | 5/2005 | Islam et al. | |
| 6,908,201 B2 | 6/2005 | Gudeman et al. | |
| 7,010,230 B2 * | 3/2006 | Lee et al. | 398/102 |
| 2004/0136645 A1 * | 7/2004 | Dingel et al. | 385/24 |
| 2005/0031248 A1 | 2/2005 | Kasper et al. | |

FOREIGN PATENT DOCUMENTS

EP          1500515 A2         1/2005

* cited by examiner

*Primary Examiner*—M. R. Sedighian  
(74) *Attorney, Agent, or Firm*—AFMCLO/JAZ; James P. Calve

(57) ABSTRACT

A digitally controlled optical delay apparatus providing optical signal delays electrically selectable in the picosecond to nanosecond range by way of selectable signal path lengths. Path lengths are incremented in physical length and path delay time according to digital ratios. The delay element includes micro-miniature path changing mirrors controlled in path length selecting positioning by input signals of logic level magnitude. Fiber optic coupling of signals to and from the delay element and a combination of fixed position and movable mirror included optical signal path lengths are included.

19 Claims, 5 Drawing Sheets

$D_4 D_3 D_2 D_1 D_0 = 01010_2 = 10_{10} \longrightarrow 10 \times \delta = 0.32$ ns delay

DIGITAL DELAY DEVICE

RIGHTS OF THE GOVERNMENT

The invention described herein may be manufactured and used by or for the Government of the United States for all governmental purposes without the payment of any royalty.

BACKGROUND OF THE INVENTION

In the generation of test and simulated images for a laser radar apparatus, for example, there is need for delaying optical signals for selectable time intervals in the sub nanosecond time range. Similarly, in the performance of signal processing for other light-based optical systems it is also desirable to introduce small digitally selected signal delays for scanner-free imaging, diffraction/holographic imaging, optical mixing, and delay-measurements.

Although such generation of optical signal delays has doubtless been heretofore accomplished in the signal processing art, it is notable that the use of digitally incremented signal delays, i.e., digital delay devices, appears to have been omitted from this art. The present invention addresses this omission.

SUMMARY OF THE INVENTION

The present invention provides a digitally incremented optical signal delay generation device.

It is therefore an object of the present invention to provide an optical signal delay apparatus useful in achieving selectable picosecond to nanosecond optical energy signal delay intervals.

It is another object of the invention to provide a fiber optic coupled optical signal delay apparatus that may be conveniently received in high component density locations of an optical signal processing apparatus.

It is another object of the invention to provide an electrically controllable optical signal delay apparatus.

It is another object of the invention to provide an optical signal delay apparatus that may be expanded or contracted in delay interval with respect to a disclosed typical embodiment of the apparatus.

It is another object of the invention to provide an optical signal delay apparatus that may be fabricated with use of electrostatic comb-drive actuators or MEMS devices or other electromechanical movable elements.

It is another object of the invention to provide an optical signal delay apparatus in which folded optical signal delay paths enable a small overall physical size of the apparatus.

It is another object of the invention to provide an optical signal delay apparatus realizable with use of conventional micromachining fabrication techniques.

It is another object of the invention to provide an optical signal delay apparatus that can make use of semiconductor materials in the fabrication of included control elements.

It is another object of the invention to provide an optical signal delay apparatus in which transition between selected optical signal delay times may be accomplished during intervals within the microsecond time range.

These and other objects of the invention will become apparent as the description of the representative embodiments proceeds.

These and other objects of the invention are achieved by a digital optical signal delay apparatus comprising the combination of:

a first optical signal communicating path of unit length and unit optical signal propagation delay time;

a second optical signal communicating path of twice unit length and twice unit optical signal propagation delay time disposable in serial with said first optical signal communicating path;

a plurality of subsequent optical signal communicating paths, each of twice length and twice optical signal propagation delay time of an immediately preceding optical signal communicating path, and each disposed in ordered increment with a preceding optical signal communicating path;

a plurality of electrically controlled optical switching elements, each located intermediate a serial pair of said optical signal communicating paths, and each selectable between a signal delay inclusive of elected of said optical signal communicating paths and a faster, optical signal communicating path delay-bypassing, path.

BRIEF DESCRIPTION OF THE DRAWINGS

The accompanying drawings incorporated in and forming a part of the specification, illustrate several aspects of the present invention and together with the description serve to explain the principles of the invention. In the drawings.

DETAILED DESCRIPTION

Figure 1:
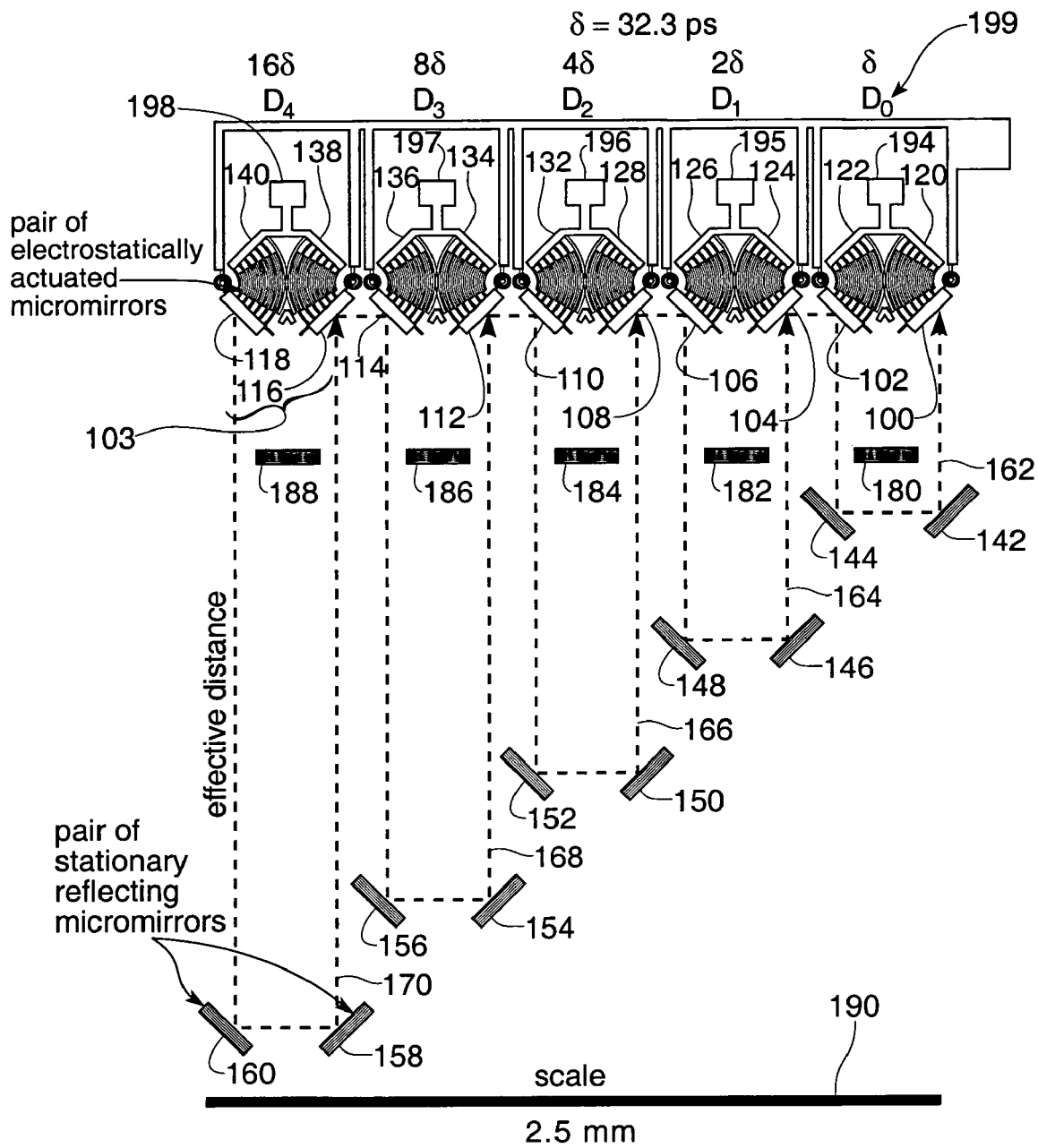
FIG. 1 shows a five bit embodiment of the optical signal delay apparatus invention in schematic form.

FIG. 1 in the drawings shows a top view schematic of a 5-bit embodiment of the present invention optical signal delay apparatus. As may be observed in this FIG. 1 view the present invention delay apparatus operates by use of the principle of optical signal delay occurring along the controlled length of a signal communication path and with electrically movable optical signal deflecting mirrors being used to determine the differing possible lengths of this path. In the FIG. 1 embodiment of the invention, an array of five sets of electrostatically positionable mirrors 100-102, 104-106, 108-110, 112-114 and 116-118 cooperate with an array of five sets of fixed position mirrors 142-144, 146-148, 150-152, 154-156, 158-160 to determine the path length for an optical signal, and thus the incurred signal delay in traveling from left to right through the FIG. 1 apparatus. The FIG. 1 drawing also shows that an additional array of mirror-resembling elements 120-122, 124-126, 128-130, 132-134 and 136-138 appear in the FIG. 1 drawing as parts of the electrically movable optical signal deflecting mirrors apparatus. These mirror appearing elements are actually fixed portions of the electrostatic actuators for the electrostatically positionable mirrors 100-102, 104-106, 108-110, 112-114 and 116-118 determining the path of a delayed signal in each bit of signal delay of the FIG. 1 apparatus.

The FIG. 1 drawing shows several additional details of an optical signal digital delay device according to the present invention. These include the dashed line paths 162, 164, 166, 168 and 170 used by an optical signal traversing the FIG. 1 apparatus, i.e., paths inclusive of the described fixed position and movable position mirrors. These details also include the additional set of fixed position mirrors 180, 182, 184, 186 and 188 used during the "OFF" or inactive or non delayed or minimum delay status of the mirrors 100-102, 104-106, 108-110, 112-114 and 116-118 in each respective bit of the FIG. 1 apparatus. Additionally shown in the FIG. 1 drawing are an overall apparatus length dimension 190, the electrodes 194, 195, 196, 197 and 198 for receipt of input signals controlling the electrostatically positionable mirrors 100-102, 104-106, 108-110, 112-114 and 116-118 and an actual delay time interval 192 for a delay of one unit length. The identification of each unit or multi-unit delay represented in the FIG. 1 drawing is provided by the symbols at 199 in FIG. 1.

Figures 2A, 2B:
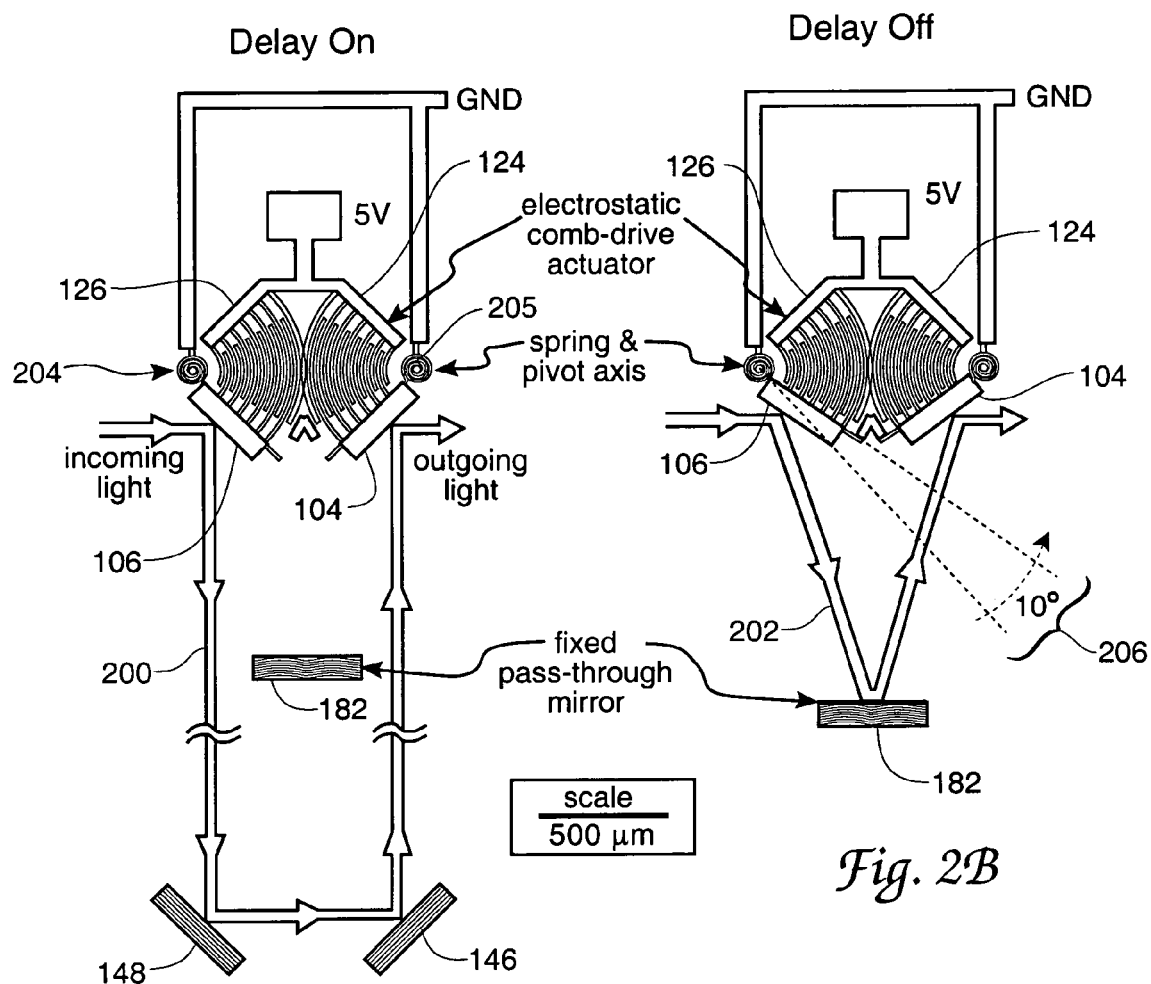
FIG. 2 includes the views of FIG. 2a, FIG. 2b and shows additional two state details of one bit in the FIG. 1 optical signal delay apparatus.

FIG. 2 in the drawings shows additional details of one optical signal delay element of a digital delay device or one bit of the FIG. 1 five-bit delay apparatus. In the FIG. 2 drawings, several labels are provided in order to name the elements shown and indicate the function provided by each element. As indicated by the numbering of various structural elements in the FIG. 2 drawing, this one bit or one delay element is selected as the D1 delay element, and is shown to include the movable mirrors 104 and 106 and other identified elements from the FIG. 1 drawing. The FIG. 2 drawing includes the views of FIG. 2a and FIG. 2b, views showing the active or delay "ON" and delay "OFF" states of this D1 element, and especially the different optical paths and differing mirror arrangements provided for each state. The convention of light movement from left to right used in FIG. 1 is maintained in the FIG. 2 drawing.

The effective delay path geometries are depicted as dashed lines in the FIG. 1 drawing and these paths are not drawn to scale in FIG. 1. For example, the effective distance between the electrostatically actuated micromirrors and the pair of stationary reflecting micromirrors 116 and 118 of delay path $D_4$ in FIG. 1 may be on the order of 16 centimeters. Little effort is, however, made herein to accurately scale the drawings according to these distances. Moreover, the effective distance in a carefully arranged or large quantity manufactured delay device is preferably achieved by using multiple sets of stationary reflecting micromirrors in the $D_4$ path to reduce the actual length of the overall delay device to, for example, no more than 4 centimeters. The effective distances of delay paths $D_3$, $D_2$, $D_1$, and $D_0$ are in the order of 8 centimeters, 4 centimeters, 2 centimeters, and 1 centimeter, respectively. The actual delay achieved for path $D_0$ in its inactive state is $\delta=32.3$ picoseconds as shown in FIG. 1

The FIG. 2 drawings include additional details of the electrostatic comb-drive actuators contemplated as one arrangement usable to rotate the movable mirror elements 104 and 106 of the D1 delay element. Comb-drive actuators of this nature are known in the electromechanical art, and are also disclosed in a plurality of U.S. Patents, including, for example, U.S. Pat. No. 5,631,514, a document hereby incorporated by reference herein. A representative illustration of the two positions and the degree of mechanical movement contemplated for the comb-drive actuator 204 in the FIG. 2 drawings appears at 206 in the FIG. 2b drawing. This ten degrees of mechanical motion is found to be sufficient to direct the optical beam 200 between the positions shown in FIG. 2a and FIG. 2b where the different fixed mirrors 146-148 and 182 are used to achieve signal delayed and signal non-delayed conditions, respectively. Alternate devices such as a MEMS rotatable mirror actuator may be used in lieu of the comb-drive actuators specified above in embodying the invention.

In operation of the FIG. 2 delay, an optical signal (light) is delayed by digitally diverting the light down the select path, or delay line, by means of movable micromirrors 104 and 106. These mirrors, two per delay line head, are controlled by an electrostatic comb-drive actuator 204 and have two distinct positions. In the non-actuated position, or digital "1" condition, no voltage is applied to the comb-drive actuator so that the mirrors at the delay line head stay in such orientation as to force the light to deflect at a 90° angle down the longest available path to a fixed mirror 148 disposed a designated distance from the delay line head. The mirror 148 at the end of the delay line forces the light to again deflect at a 90° angle toward another fixed mirror 146, which is in an inverted orientation to the first mirror at the end of the delay line so that the light is directed back up to the delay line head to the second mirror 104 on the delay line head. This second mirror is attached to the same comb-drive as the first mirror, is also in the non actuated digital "1" position, forcing the light to travel at a 90° angle toward the next delay line head, which is represented by the next bit or delay path.

In the actuated position, or digital "0" condition, a control signal of, for example, 5-volt magnitude is applied to the FIG. 2 comb drive actuator causing both mirrors on the delay line head to be deflected by 10 degrees, thus guiding the incoming light to travel at an angle sufficient to direct it toward a fixed pass-through mirror 182 located directly between and just below the two mirrors on the delay line head as is shown in the FIG. 2b drawing. This mirror 182 then guides the light back toward the second mirror on the delay line head and on to the next delay line head. When control voltage is removed, mechanical springs located at each mirror pivot axis cause the deflected mirrors to return to their original positions.

With reference to the FIG. 1 arrangement of the invention, the first delay line head 103 corresponds to the longest delay line ($D_4$) and is represented by the most significant digital bit being a logic "1", with an open or no voltage signal applied to the comb-drive 140. Alternately a logic "0", with a closed or active voltage signal such as 5 volts applied to the comb-drive can be used to achieve the desired mirror position if a differing arrangement of the delay line head 103 and the electrostatic comb-drive actuator 140 is selected.

Figure 3:
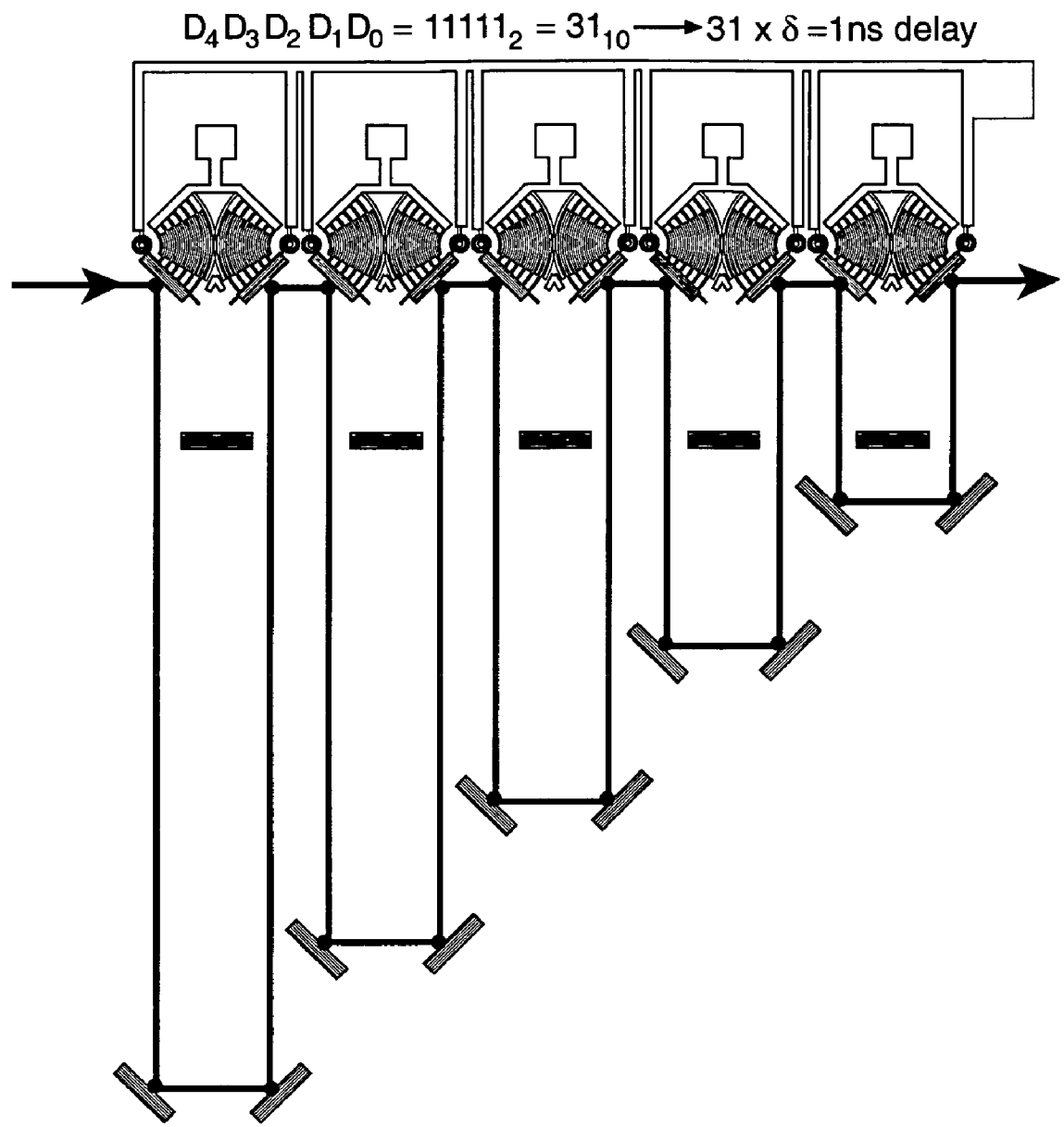
FIG. 3 shows the FIG. 1 and FIG. 2 optical signal delay apparatus in a maximum delay state.
Figure 4:
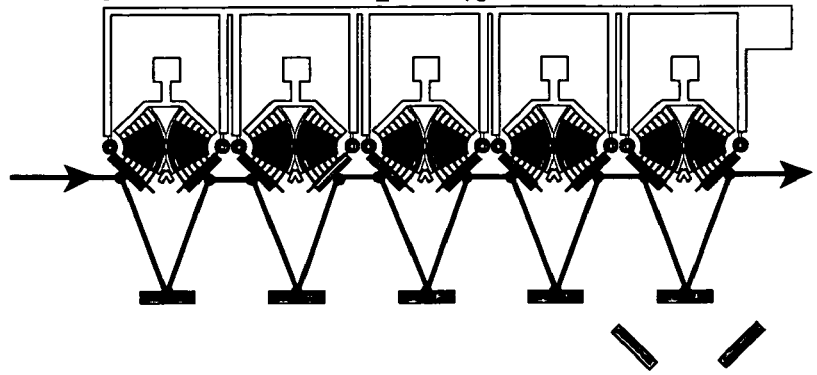
FIG. 4 shows the FIG. 1 and FIG. 2 optical signal delay apparatus in a minimum delay state.
Figure 5:
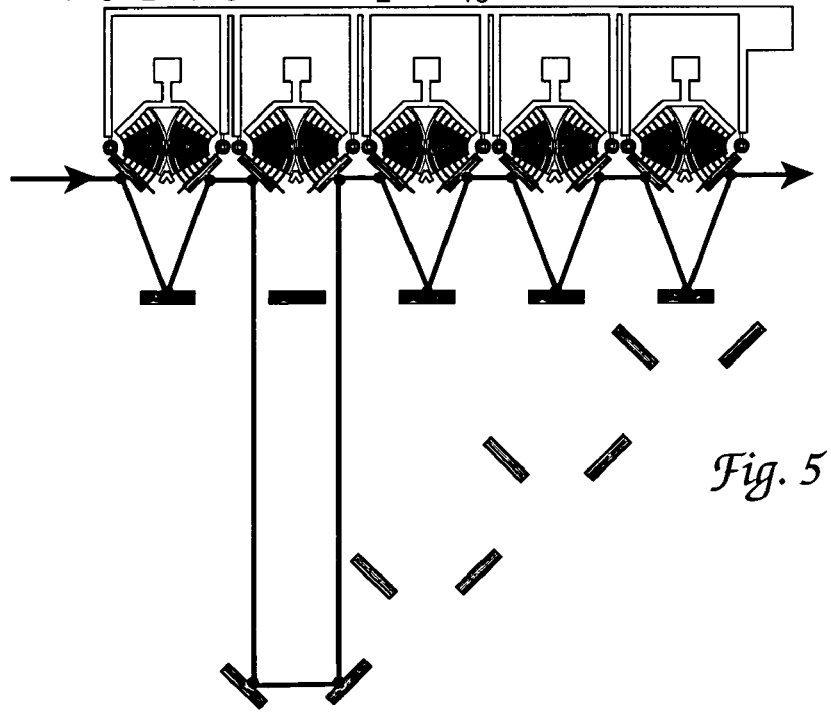
FIG. 5 shows the FIG. 1 and FIG. 2 optical signal delay apparatus in a specific one bit active delay state.
Figure 6:
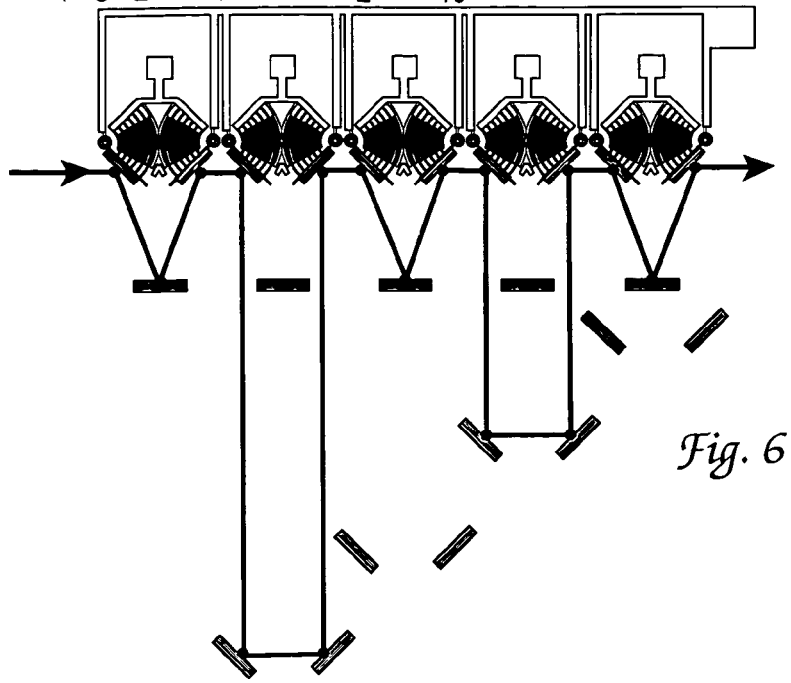
FIG. 6 shows the FIG. 1 and FIG. 2 optical signal delay apparatus in a specific two bit active delay state.

A digital delay device with all delay line heads in the "1" position corresponds to the longest available delay time for the FIG. 1 showing of the invention, a delay of 1 nanosecond. This arrangement of the invention is depicted in the FIG. 3 drawing. A digital delay device with all delay line heads in the "0" position corresponds the shortest available delay of $\delta=32.3$ picoseconds, and is depicted in the drawing of FIG. 4. The drawings of FIGS. 5 and 6 represent intermediate delay times of 0.26 and 0.32 nanoseconds, respectively.

The effective lengths of the delay lines are multiples of the length of the least significant bit's delay, i.e., 1 centimeter or $\delta=32.3$ picoseconds. Representing the shortest effective length as 1, each delay line is thus $1*2^N$ in length, where $D_N$ is the corresponding bit position of the delay line from N=0 to M−1 for M number of delay lines. The digital delay device of the invention can, of course, be extended to more than 5 bits for additional combinations of longer delays.

The digital delay device of the present invention can be fabricated through use of a commercially available micromachining process such as the Metal MUMPs® process offered by MEMSCAP of 4021 Stirrup Creek Drive, Suite 120, Durham, N.C. 27709-9352, phone: 919-314-2200, fax: 919-314-220.

The Metal MUMPs process offers a 25 micrometer-thick electroplated nickel layer whose sidewalls can be coated with an evaporated gold film. This nickel layer can be utilized to realize the micromirrors, comb-drive actuators, wiring, and bonding pads. Additional surface micromachined films of Silicon Nitride, $Si_3N_4$, and polycrystalline silicon can be utilized to realize additional electrical connections, structural supports, return springs, and pivot axes.

A group of microstructure embodiments of the invention may be fabricated on a 500 µm thick crystalline silicon substrate, for example.

Figure 7:
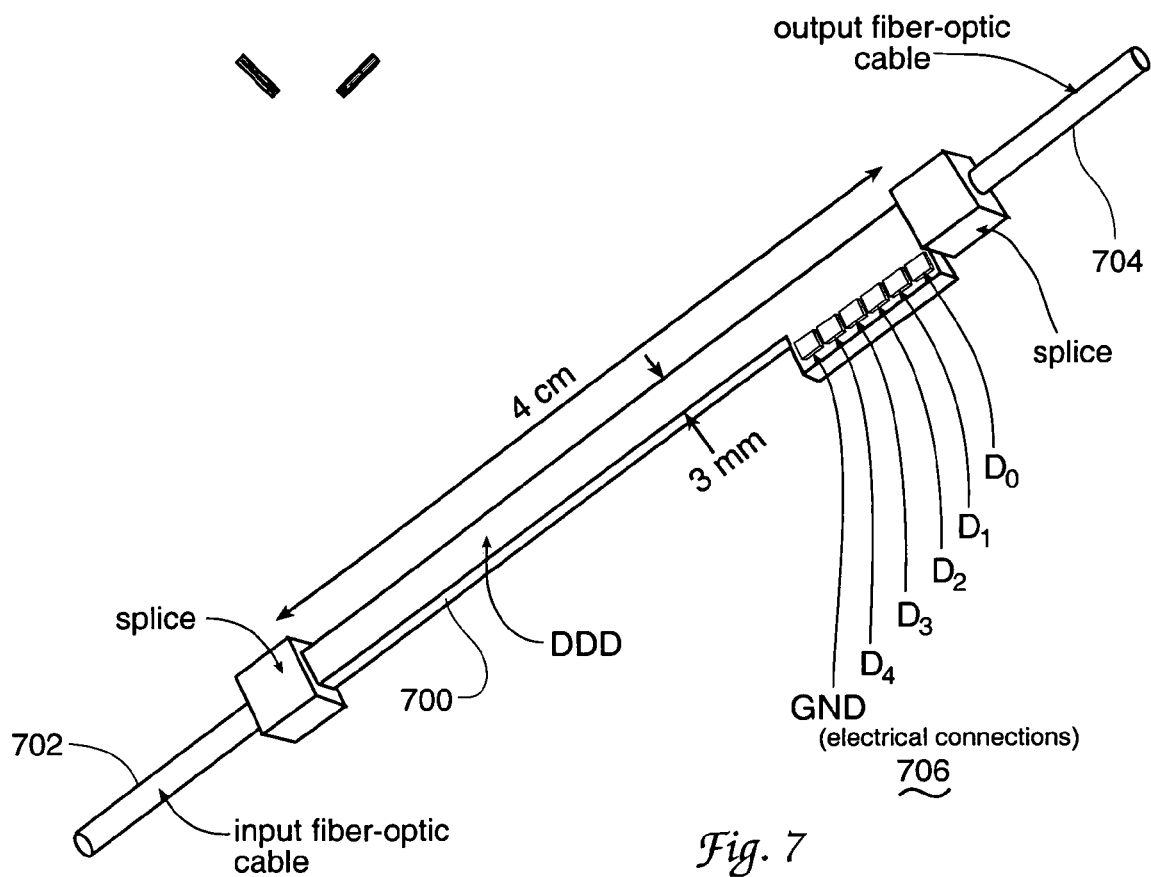
FIG. 7 shows the FIG. 1 and FIG. 2 optical signal delay apparatus in one possible physical embodiment.

FIG. 7 in the drawings shows a physical arrangement usable to contain the described embodiment of the present invention. In the FIG. 7 drawing there appears a rectangular tube 700 in which the delay paths shown in FIG. 1, for example, may be realized in the above recited additional mirror and folded delay path fashion. The FIG. 7 drawing also shows the input and output fiber optic signal conductors 702 and 704 that may be used to convey optical signals to and from the delay device 700. These input and output conductors may be parts of a continuous optical path to which the delay device 700 has been added. An overall length dimension of 4 centimeters is shown for the delay device 700. An array of electrical contacts usable to connect the FIG. 7 apparatus to an electrically energizing source of digital control signals appears at 706 in the FIG. 7 drawing. The leftmost of these contacts may, for example, be the common electrical ground connection to which one terminal of each electrostatic comb-drive actuator is connected. These contacts are, of course, the contacts indicated at 194 etc. in the FIG. 1 drawing. Typically incoming signal to a FIG. 7 type of device is launched into the delay path(s) using a well cleaved fiber, mirror, or lens. Such use of fiber is preferred, since the incoming data/signal is thusly launched as a precise ray as required.

The illustrated and discussed arrangement of the digital delay device is by no means optimized for size, and can be scaled down to realize a smaller, more compact arrangement. The maximum switching speed of the digital delay device is limited only by the switching speed of the electronic drive circuitry and the switching speed of the electrostatically actuated comb-drive mirrors. The switching speed of the mirrors is determined by the mass of a mirror, stiffness of the return spring, and damping. The damping of the mirrors can be controlled by the geometry of the comb-drive and the mirror, and by the packaging conditions such as the vacuum or positive pressure atmosphere of air or another fluid used.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular scope of the invention as determined by the appended claims when interpreted in accordance with the breadth to which they are fairly, legally and equitably entitled.

We claim:

1. Digitally incremental optical signal delay apparatus comprising:

an optical signal input path connecting to a plurality of serial coupled optical switching elements and a subsequent optical signal output path in said apparatus;

each of said plurality of serially coupled optical switching elements including a first optical through path course and a selectable second optical through path course located therein;

said first optical through path course having a plurality of optical signal communicating longer paths each disposed adjacent of a respective one of said serially coupled optical switching elements; and said selectable second optical through path course having a plurality of optical signal communicating short paths each disposed adjacent of said serially coupled optical switching elements and between said first optical through path course and said serially coupled optical switching elements;

said optical signal communicating longer paths each being of differing optical signal length and optical signal time delay characteristics;

said optical signal communicating longer path length and signal delay time characteristics being respectively related according to a 1, 2, 4, 8, 16 and so-on mathematical relationship;

said selectable second optical through path course and said optical signal communicating longer paths between said optical switching elements being electrically selectable by said optical switching elements of said optical delay apparatus; and said electrical selection by said optical switching elements determining a presence of minimal or selected increased optical signal delay time intermediate said optical signal input path and said optical signal output path of said optical delay apparatus.

2. The digitally incremental optical signal delay apparatus of claim 1 wherein said optical signal input path and said optical signal output path each include a fiber optic signal communicating member.

3. The digitally incremental optical signal delay apparatus of claim 1 wherein said optical switching elements comprise one of an electrostatic comb drive actuator mounted mirror element and a micromechanical electrical systems mounted mirror element.

4. The digitally incremental optical signal delay apparatus of claim 1 wherein said optical signal communicating short paths each include a single fixed mirror element.

5. The digitally incremental optical signal delay apparatus of claim 1 wherein said optical signal communicating longer paths each include a pair of fixed mounted mirror elements.

6. The digitally incremental optical signal delay apparatus of claim 1 wherein said optical switching elements each include a crystalline substrate member.

7. The digitally incremental optical signal delay apparatus of claim 1 wherein said optical switching elements each include an angularly movable micromirror element.

8. The digitally incremental optical signal delay apparatus of claim 7 wherein said optical switching elements angularly movable micromirror element includes an angular motion of ten degrees.

9. The digitally incremental optical signal delay apparatus of claim 1 wherein said plurality of optical signal communicating longer paths include a path having a signal propagation delay measurable in tens of picoseconds and delays measurable in successive digital increments thereof.

10. Digital optical signal delay apparatus comprising:

a first optical signal communicating path of unit length and unit optical signal propagation delay time;

a second optical signal communicating path of twice unit length and twice unit optical signal propagation delay time disposable in serial with said first optical signal communicating path;

a plurality of subsequent optical signal communicating paths each of twice length and twice optical signal propagation delay time of an immediately preceding optical signal communicating path and each disposed in ordered increment with a preceding optical signal communicating path; and a plurality of electrically controlled optical switching elements each located intermediate a serial pair of said optical signal communicating paths and each selectable between a signal delay inclusive of said optical signal communicating paths and a shorter delay, optical signal communicating path, wherein said shorter delay optical signal communicating path includes a fixed single optical signal reflecting mirror element and an optical signal path shorter than said unit length signal communicating path.

11. The digital optical signal delay apparatus of claim 10 wherein said optical signal communicating paths are air paths and said electrically controlled optical switching elements are micromechanical electrical systems optical switches.

12. The digital optical signal delay apparatus of claim 11 wherein said optical switching elements include a spring biased micromirror element.

13. The digital optical signal delay apparatus of claim 10 wherein said optical signal communicating paths each include a pair of fixed optical signal reflecting mirror elements.

14. The digital optical signal delay apparatus of claim 10 wherein said electrically controlled optical switching elements comprise micrometer sized comb drive electrostatic actuators.

15. The digital optical signal delay apparatus of claim 10 wherein said unit length signal communicating path is characterized by a signal delay of less than one hundred picoseconds.

16. The digital optical signal delay apparatus of claim 10 wherein said optical signal communicating paths are five in number and comprise electable signal delays of 1, 2, 4, 8 and 16 relative length.

17. The digital optical signal delay apparatus of claim 10 wherein said apparatus includes an elongated housing having fiber optic input and output signal paths and a plurality of electrical signal terminals connecting with said electrically controlled optical switching elements.

18. Digital optical signal delay apparatus comprising:

a serial plurality of optical signal communicating path longer delay elements each of twice length and twice optical signal propagation delay time of an immediately preceding optical signal communicating path delay element and each disposed in increasing delay increment series with said preceding optical signal communicating path delay element;

a plurality of electrically controlled optical switching elements; and a plurality of optical signal communicating shorter delay paths, wherein each of said plurality of optical signal communicating shorter delay path elements comprise a fixed single optical signal reflecting mirror element.

19. The digital optical signal delay apparatus of claim 18, wherein each of said plurality of optical signal communicating shorter path delay elements is selectable to provide a shorter delay time than a respective one of said serial plurality of optical signal communicating path longer delay elements.

* * * * *